L. B. CLOGSTON.

Gates for Gangs for Marble Saws.

No. 5,672. Reissued Dec. 2, 1873.

Witnesses.
George E. Upham,
Jos. B. Loomis.

Inventor
Lucius B. Clogston.
Chipman Hoomer & Co
Attorneys.

A.M. PHOTO-LITHOGRAPHIC Co. N.Y. (OSBORNE'S PROCESS)

UNITED STATES PATENT OFFICE.

LUCIUS B. CLOGSTON, OF WEST RUTLAND, VERMONT, ASSIGNOR OF ONE-HALF INTEREST TO CHARLES H. SHELDON, OF SAME PLACE.

IMPROVEMENT IN GATES FOR GANGS FOR MARBLE-SAWS.

Specification forming part of Letters Patent No. 119,968, dated October 17, 1871; antedated September 30, 1871; reissue No. 5,672, dated December 2, 1873; application filed November 15, 1873.

*To all whom it may concern:*

Be it known that I, LUCIUS B. CLOGSTON, of West Rutland, in the county of Rutland and State of Vermont, have invented a new and useful Improvement in Gates for Gangs for Marble-Saws; and I do hereby declare that the following is a full, clear, and exact description thereof, which will enable others skilled in the art to make and use the same.

This invention relates to the construction of frames or gates for carrying gangs of saws intended for sawing marble into slabs; and it consists in novel means for connecting tubular side pieces with channeled iron head-blocks, substantially as hereinafter explained.

Figure 1:
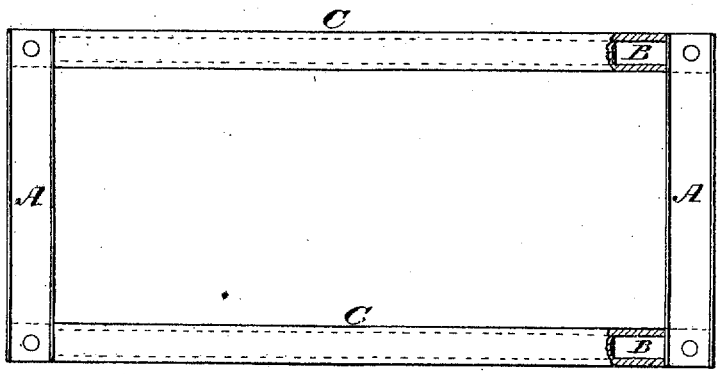
Figure 2:
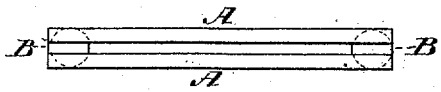
Figure 3:
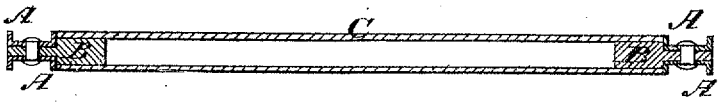

Heretofore frames or gates for gangs of marble-cutting saws have usually been constructed of wooden sides and solid cast-iron head-blocks, in which case they were necessarily very heavy, cumbersome, and required the expenditure of considerable power to give them the desired speed. These objections I overcome in the following simple manner:

Figure 1 of the annexed drawing is a plan view, partly in section, of a saw-gate as I improve it. Fig. 2 is an edge view of the head-blocks. Fig. 3 is a longitudinal sectional view of the side tubes and cross-sections of the head-blocks.

Similar letters of reference indicate corresponding parts in the several figures.

A A represent the head-blocks, which are respectively composed of two bars of channeled iron. C C are the side pieces, which are tubular throughout their whole length; and B designates coupling-plugs, which are riveted between the ends of the channeled iron bars, forming the head-blocks A, and fitted into the extremities of the tubular side pieces C C. These coupling-plugs A are partly cylindrical, to fit into the side pieces, and partly flat to receive the channeled bars, against the flanges of which the ends of pieces C C abut, as shown in Fig. 3. A series of saws is stretched between and parallel to the side pieces C C, at a suitable distance apart, and strained in any suitable manner.

The frame or gate thus described possesses great strength and lightness, and can be run at a high rate of speed with comparatively little expenditure of power.

It is apparent that a head-block of channeled iron, as described, not only possesses desirability by reason of its lightness, but also from the fact that saws may be arranged therein with great ease and security. Heretofore, when from any cause the saws were attached in a solid head-block upon an improper angle great difficulty has been experienced in adjusting them properly; but by my channeled block all such difficulty is obviated.

What I claim as new, and desire to secure by Letters Patent, is—

1. Intermediate couplings B, as means for connecting the ends of channeled-iron head-blocks A A to tubular side pieces C C of a saw-frame, substantially as described.

2. In a frame for gang-saws for marble manufacture, the head-block of wrought and channeled iron, constructed substantially as specified.

In testimony that I claim the above I have hereunto subscribed my name in the presence of two witnesses.

LUCIUS B. CLOGSTON.

Attest:
THOS. CAMPBELL,
JOHN SMITH.